United States Patent [19]
Wilkinson

[11] 4,447,845
[45] May 8, 1984

[54] REACTANCE RELAY

[75] Inventor: Stanley B. Wilkinson, Havertown, Pa.

[73] Assignee: General Electric Company, King of Prussia, Pa.

[21] Appl. No.: 395,951

[22] Filed: Jul. 7, 1982

[51] Int. Cl.³ .............................................. H02H 3/26
[52] U.S. Cl. ...................... 361/80; 361/85; 361/67
[58] Field of Search ............. 361/80, 82, 83, 67, 361/81, 79, 85, 84, 62, 63, 65; 324/51, 52, 83 R

[56] References Cited

U.S. PATENT DOCUMENTS

| | | | |
|---|---|---|---|
| 3,379,933 | 4/1968 | Hoel | 361/80 X |
| 3,379,936 | 4/1968 | Hoel | 361/81 |
| 3,413,523 | 11/1968 | Hoel | 361/80 |
| 4,148,087 | 4/1979 | Phadke | 361/80 |
| 4,161,011 | 7/1979 | Wilkinson | 361/80 |
| 4,297,740 | 10/1981 | Hagberg | 361/67 |

*Primary Examiner*—Patrick R. Salce
*Attorney, Agent, or Firm*—William Freedman

[57] ABSTRACT

Disclosed is an improved reactance type protective relay that increases security against false tripping while still providing desired protection for a high voltage transmission line. The improved reactance relay employs a circuit arrangement having characteristic timers that optimize the performance of the reactance relay and also allows for desired coordination between the reactance relays that may be located along the high voltage transmission line.

6 Claims, 4 Drawing Figures

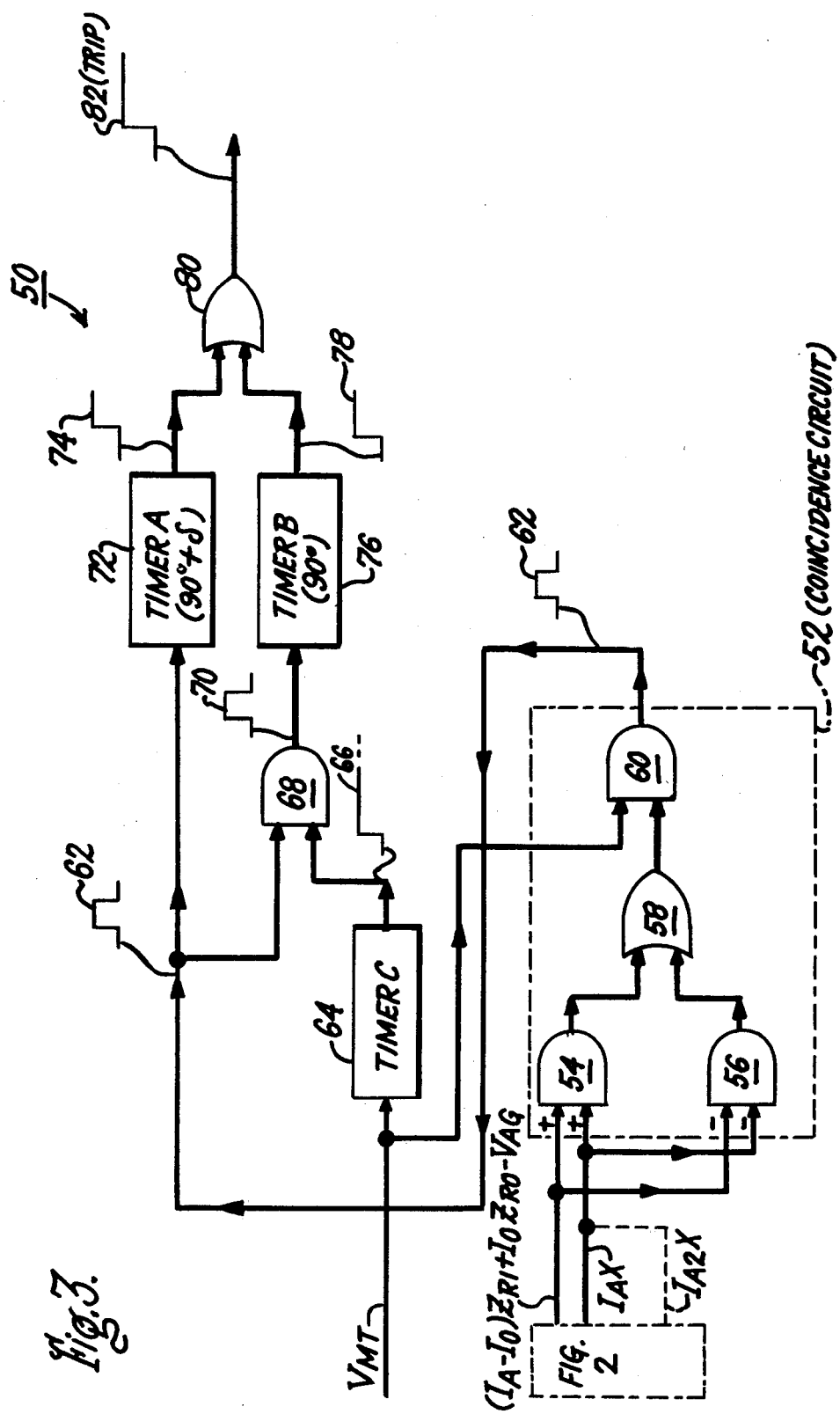

REACTANCE RELAY

BACKGROUND OF THE INVENTION

The present invention relates to a protective system for a high voltage transmission line, and more particularly, to an improved reactance type protective relay.

Protective systems for high voltage transmission lines commonly employ a protective relay as part of that protective system for detection of fault conditions within a protected portion of the transmission line. A reactance type protective relay may be coupled to a particular phase A, B, or C of the transmission line or a phase pair AB, BC, or CA of the transmission line. However, because substantial fault resistance is more common for faults involving ground, the reactance relay is typically employed to measure the impedance between phase and ground.

The operating characteristic of the reactance type relay is typically specified in terms of a resistance (R) and reactance (X) diagram and the characteristic of the reactance type relay is typically displaced from and in parallel with the R axis of the diagram.

It has been the practice in some applications to use an angle impedance characteristic, rather than a typical reactance characteristic, which is tilted toward the R axis, thus permitting operation on a decreasing reactance magnitude as the resistive component of the fault impedance increases.

It has also been the practice in some applications to use a sequence component of the phase current that does not include load current, such as the negative or zero sequence component, for polarizing the reactance relay. The primary effect of the sequence components is that the load flow can be eliminated from causing the relay current to have a different phase angle compared to the fault current. However, the different impedance angles from the fault to the source on either side of the fault may still cause an apparent reactive component in the fault resistance. The apparent reactive component that may occur can be difficult to evaluate since the source impedance angle may change with system switching. Further, if there is disymmetry in the power system, there will probably be negative and zero sequence currents generated as a consequence of load current flowing through the disymmetry that will cause even greater difficulty in assessing the apparent reactive component in the fault resistance.

It should be noted that the apparent reactive component in the fault resistance can be positive or negative, causing the reactance relay to underreach or overreach. The terms "underreach" and "overreach" are related to the reach of the relay. The reach of the relay is the reactive component of the impedance between the relay and the fault for which the relay is set to operate.

Overreaching results when the reactance from the relay to the fault is larger than the reach setting of the relay, but the addition of the apparent negative reactance in the fault impedance causes the net reactance seen by the relay to be less than the reach setting. Conversely, the reactance between the relay and the fault may be less than the reach setting of the relay, but the addition of an apparent positive reactance in the fault impedance could cause the total reactance seen by the relay to be greater than the reach setting of the relay, thus causing "underreaching".

If the security, (that is, security against misoperation of the protective relay), is very important, then the relay characteristic may have to be tilted substantially towards the R axis (with increasing fault resistance magnitude) to ensure that overreach does not occur for the worst combination of the factors mentioned above. Thus, substantial underreach may result if the combination of the factors mentioned above contribute to underreach, as well as the underreach obtained by tilting the characteristic of the angle impedance relay. If dependability (that is the ability to trip on internal faults) is more important, then the reactance characteristic is used, but with the risk of false tripping due to overreach.

Accordingly, it is an object of the present invention to provide an improved reactance type relay having means to discriminate against overreaching and underreaching along the transmission line so as to provide a highly reliable (in both security and dependability) protective relay.

These and other objects of the present invention will become apparent to those skilled in the art upon consideration of the following description of the invention.

SUMMARY OF THE INVENTION

The present invention is directed to an improved reactance type relay. In accordance with one preferred embodiment of the invention a reactance type relay has two characteristic timers A and B and a TIMER C developing an output after a preselected delay following receipt of an input. The characteristic TIMER A provides the reactance type relay with an initial state tent-like characteristic. The characteristic TIMER B provides the reactance type relay with a final state reactance characteristic. The TIMER A has a setting of $90° + \delta$, which produces an angle of separation of $\delta$ electrical degrees between the tent-like and the reactance characteristics. Means responsive to the generation of an output by TIMER C for shifting the operating characteristic of the relay from the tent-like characteristic of TIMER A to the reactance characteristic of TIMER B is provided.

The features of the invention believed to be novel are set forth with particularity in the appended claims. The invention, itself, however, both as to its organization and operation together with further objects and advantages thereof may best be understood by reference to the following description taken in conjunction with the accompanying drawings.

BRIEF DESCRIPTION OF THE DRAWINGS

FIG. 1b is a reactance-impedance (R-X) diagram related to the reactance relay of the present invention located at the substations of FIG. 1a.

FIG. 3 is a circuit arrangement of the present invention.

DETAILED DESCRIPTION OF THE PREFERRED EMBODIMENT

Figure 1A:
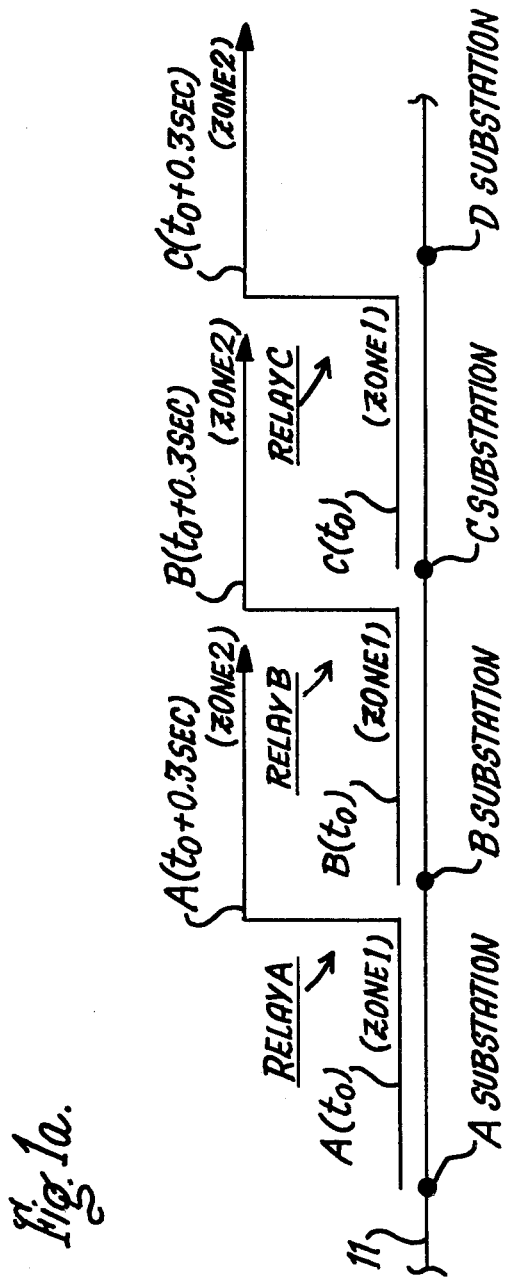
FIG. 1a is a diagram showing the stepped distance protections of the relays located at various substations along a transmission line.
Figure 1B:
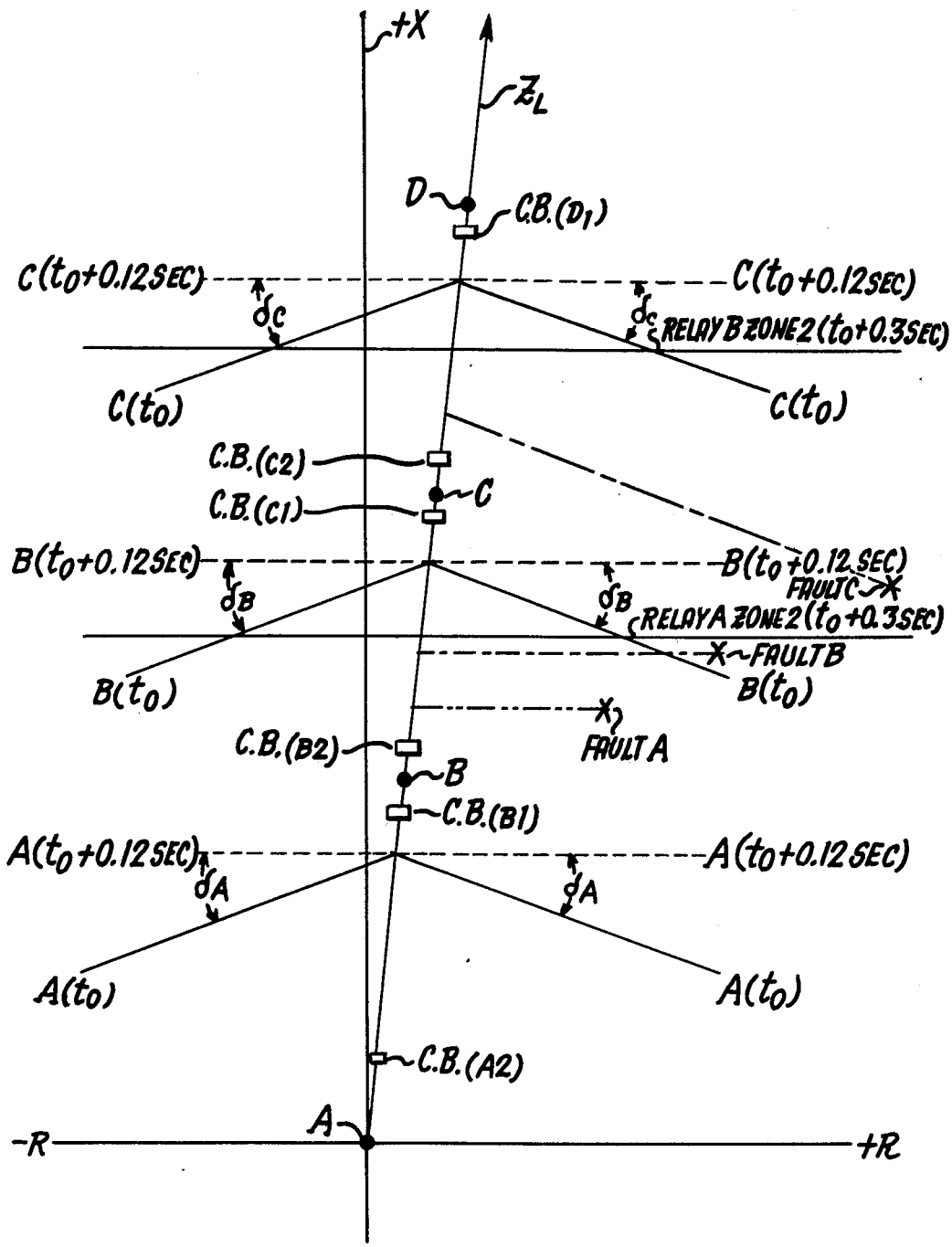

FIGS. 1a and 1b are related to the operational characteristics of the reactance relay of the present invention and are to be described hereinafter with regard to the OPERATIONAL RESPONSE Section of this invention.

Figure 2:
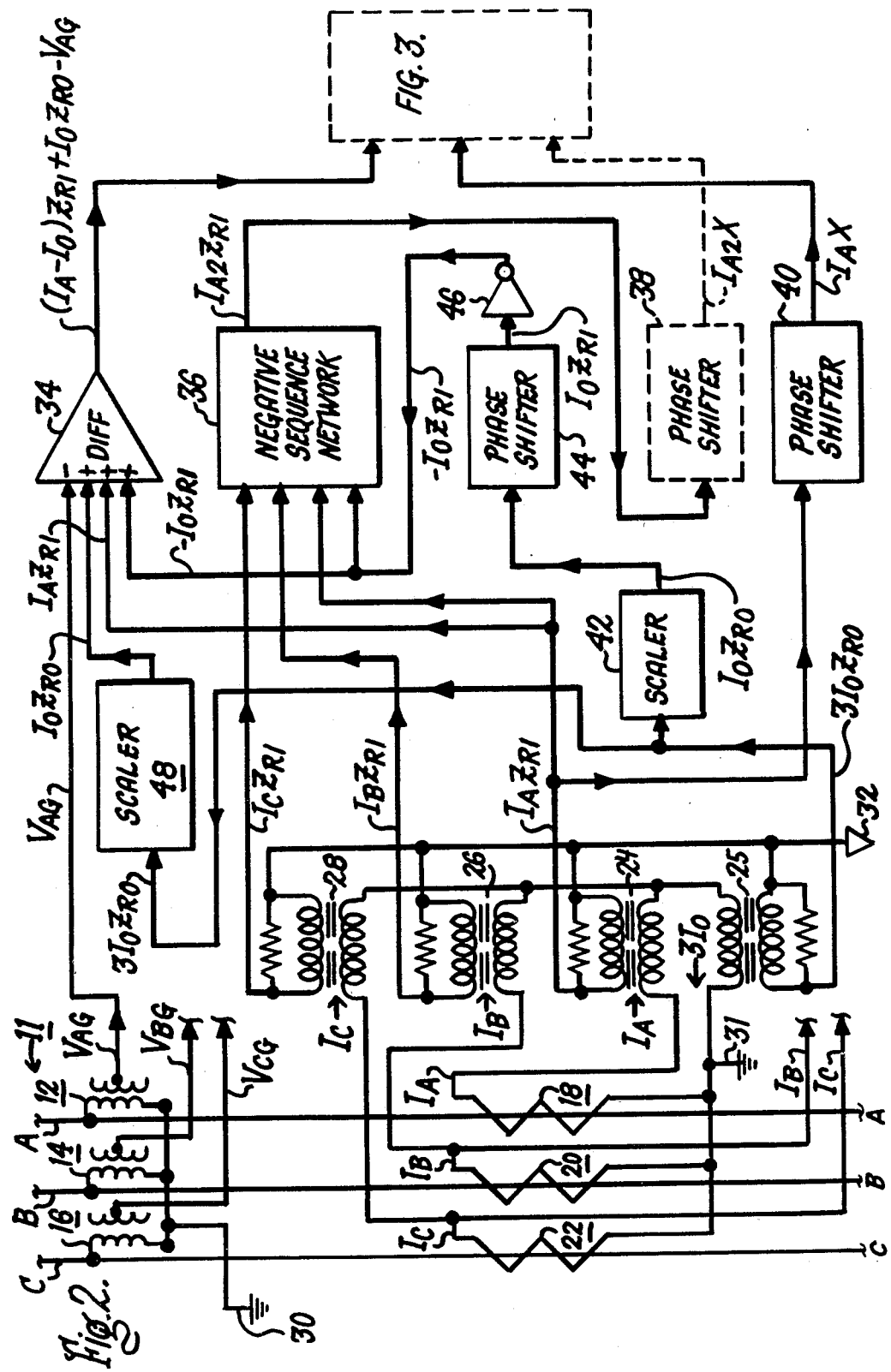
FIG. 2 is a block diagram in accordance with the present invention for developing the desired source signals for the circuit of FIG. 3.

The reactance relay of the present invention is coupled to a transmission line by coupling devices 12...22 shown most clearly in FIG. 2. The circuit arrangement of FIG. 2 is shown as being coupled to receive a plurality of source signals mainly comprised of $I_A$, $I_B$, $I_C$, $3I_O$, $V_{AG}$, $V_{BG}$, and $V_{CG}$, the first four of which are representative of current conditions within the three phase transmission line 11 and the last three of which are representative of voltage conditions within the three phase transmission line 11. The circuit arrangements of FIGS. 2 and 3 show and describe the present invention with reference to phase A quantities. It should be recognized that the present invention is equally applicable to the development and usage of the phase B or phase C quantities. The phases A, B, and C quantities may be generically referred to hereinafter by the use of a subscript P of which the letter P signifies phase.

The circuitry of FIG. 2 responds to the plurality of source signals to develop the desired quantities which are routed to a circuit arrangement of FIG. 3 of the present invention. Table 1 lists the signals of FIGS. 2 and 3 and gives a general definition for each.

TABLE 1

| Quantities | General Definitions |
| --- | --- |
| $I_A$, $I_B$ and $I_C$ | Current signals respectively representative of the current flowing within phases A, B, and C of the transmission line 11. |
| $I_{A2}$ | Current signal representative of the negative sequence component of the phase A current with the currents $I_A$, $I_B$, and $I_C$ flowing in the transmission line 11. |
| $I_O$ | Current signal representative of the zero sequence component of the currents $I_A$, $I_B$ and $I_C$ flowing in the transmission line 11. |
| $Z_{R1}$ | The replica of the positive sequence impedance of the transmission line 11. |
| $Z_{R0}$ | The replica of the zero sequence impedance of the transmission line. |
| $V_{AG}$, $V_{BG}$, and $V_{CG}$ | The voltage respectively representative of the voltages between phases A, B, and C to ground |
| $V_{MT}$ | Command Fault Detector signal. |
| X | A quantity representative of the reactive impedance of the relay. |
| $I_A X$ | Signal representative of the product of the quantities $I_A$ and X. |
| $I_{A2} X$ | Signal representative of the product of the quantities $I_{A2}$ and X. |

FIGS. 2 and 3 also show a phasor quantity $(I_A - I_O)Z_{R1} + I_O Z_{RO} - V_{AG}$ which will be further described hereinafter with regard to its applicable relationship to the present invention.

The circuit arrangements shown in FIGS. 2 and 3 are comprised of a plurality of elements given in Tables 2 and 3 respectively. The elements of FIG. 2 are of a conventional type except for the negative sequence network 36 which is described in U.S. application Ser. No. 297,542, filed Aug. 31, 1981, and issued as U.S. Pat. No. 4,342,062. The elements of FIG. 3 are AND circuits, OR circuits and Timers. The Timers 64, 72 and 76 of FIG. 3 may be of the type described in U.S. patent applications Ser. No. 369,440 filed Apr. 19, 1982, and Ser. No. 378,589, filed on May 17, 1982, both of T. B. Breen or the type described in my U.S. Pat. No. 4,161,011. All the above U.S. patent applications and U.S. Patent are assigned to the same assignee of the present invention and are herein incorporated by reference.

Table 2

Elements

Current transformers 18, 20 and 22
Transactors 24, 25, 26 and 28
Voltage potential transformers 12, 14, 16
Differential amplifier 34
Scalers 42 and 48
Signal inverter 46
Phase Shifters 38, 40 and 44
Negative Sequence Network 36

Table 3

Elements

AND circuits 54, 56, 60, and 68
OR circuits 58 and 80
TIMERS 64, 72 and 76

FIG. 2 shows the current transformers 18, 20 and 22 respectively coupled to phases A, B, and C of the transmission line 11. The current transformers 18, 20 and 22 respectively couple to the transactors 24, 26, and 28 the signals $I_A$, $I_B$, and $I_C$. Each of the other end of the primary windings of each transactor 24, 26, and 28 is connected to the one end of the primary winding of transactor 25 so as to develop the signal $3I_O$ across the primary winding of transactor 25. The other side of each of the primary windings of each of the transactors 24, 25, 26 and 28 are coupled together and commoned to the other side of each of the current transformers 18, 20 and 22, which, in turn, are connected to a substation ground 31.

As also shown in FIG. 2, one side of each of the secondary windings of each of the transactors 24, 25, 26, and 28 is coupled to a reference potential 32 of the power supply for the protective relay. The turns ratio, resistance loading and transfer impedance of each of the transactors 24, 26 and 28 are selected so that their signals $I_A$, $I_B$ and $I_C$, respectively, are multiplied by a factor substantially equal to the $Z_{R1}$ quantity so as to develop output signals from transactors 24, 26, 28 which are respectively representative of the quantities $I_A Z_{R1}$, $I_B Z_{R1}$ and $I_C Z_{R1}$. Similarly, the signal out of transactor 25 produces a signal representative of $3I_O Z_{RO}$.

As further shown in FIG. 2, one side of each of the primary windings of potential transformers 12, 14 and 16 is coupled to a system ground 30. The potential transformers 12, 14 and 16 respectively develop the quantities $V_{AG}$, $V_{BG}$, and $V_{CG}$ at their secondary windings. The signal $V_{AG}$ is routed to the negative (−) input of Differential Amplifier 34.

The signal $3I_O Z_{RO}$ is routed to (1) a Scaler 42 and (2) a Scaler 48. Each of the Scalers 42 and 48 have a scaler constant of (⅓) so as to each develop a signal $I_O Z_{RO}$. The output signal $I_O Z_{RO}$ of Scaler 48 is routed to a positive (+) input of Differential Amplifier 34.

The output signal of Scaler 42 is routed to a Phase Shifter 44 which develops the output signal $I_OZ_{R1}$, which, in turn, is routed to a Signal Inverter 46 which develops the signal $-I_OZ_{R1}$. The signal $-I_OZ_{R1}$ is routed to (1) a reference input to the Negative Sequence Network 36, and (2) to a positive (+) input of the Differential Amplifier 34.

The signal $I_AZ_{R1}$ developed by transactor 24, is routed to the positive (+) input of Differential Amplifier 34 having at its negative input the signal $V_{AG}$ and its positive inputs the signals $I_OZ_{RO}$ and $-I_OZ_{RO}$ so as to develop an output quantity $(I_A-I_O) Z_{R1}+I_OZ_{RO}-V_{AG}$ of FIG. 2. The signal $I_AZ_{R1}$, developed by transactor 24, is routed to Phase Shifter 40 which develops an output signal $I_AX$.

The signals $I_AZ_{R1}$, $I_BZ_{R1}$ and $I_CZ_{R1}$ are routed to the Negative Sequence Network 36 which has applied to it the reference signal $-I_OZ_{R1}$. The Negative Sequence Network 36 develops the signal $I_{A2}Z_{R1}$. The signal $I_{A2}Z_{R1}$ is routed to a Phase Shifter 38 so as to transform the input signal $I_{A2}Z_{R1}$ to an output signal $I_{A2}X$ of Phase Shifter 38.

The circuit arrangement of FIG. 2 provides three output signals $(I_A-I_O) Z_{R1}+I_OZ_{RO}-V_{AG}$, $I_AX$, and $I_{A2}X$. The present invention has a first and a second embodiment. In the first embodiment the output signal $(I_A-I_O) Z_{R1}+I_OZ_{RO}-V_{AG}$, and $I_AX$ are applied to the circuit arrangement of FIG. 3 for further development, whereas, in the second embodiment the output signal $(I_A-I_O) Z_{R1}+I_OZ_{RO}-V_{AG}$, and $I_{A2}X$ are applied to the circuit arrangement of FIG. 3 for further development. The signal $I_{A2}X$ along with its Phase Shifter 38 related to the second embodiment are both shown in phantom in FIG. 2.

The description to follow only describes the further development of the signals of the first embodiment $(I_A-I_O) Z_{R1}+I_OZ_{RO}-V_{AG}$ and $I_AX$, however; it should be recognized that unless otherwise specified the description of FIG. 3 related to the quantities $(I_A-I_O) Z_{R1}+I_OZ_{RO}-V_{AG}$ and $I_AX$ of the first embodiment is equally applicable to the quantities of the second embodiment $(I_A-I_O) Z_{R1}+I_OZ_R-V_{AG}$ and $I_{A2}X$.

The signal $I_AX$ is applied to the first input of AND circuit 54 and to the first input of AND circuit 56 of FIG. 3. The signal $(I_A-I_O) Z_{R1}+I_OZ_{RO}-V_{AG}$ is applied to the second input of the AND circuit 54 and to the second input of AND circuit 56.

FIG. 3 further shows a third applied signal which is the Command Fault Detector signal $V_{MT}$ generated by a circuit (not shown) and which is indicative that a fault has been detected on the referenced phase of the transmission line 11. The $V_{MT}$ is a continuous signal that begins shortly after the occurrence of the fault and continues for the duration of the fault or slightly longer than the fault duration. The development of the $V_{MT}$ signal is not considered part of this invention but reference may be made to U.S. patent application Ser. No. 309,549, of L. P. Cavero, filed Oct. 7, 1981 and issued as U.S. Pat. No. 4,405,966 for a detailed description of the $V_{MT}$ signal. U.S. patent application Ser. No. 309,549 is assigned to the same assignee of the present invention and is herein incorporated by reference. A signal of the type $V_{MT}$ described in Cavero's U.S. patent application is applied to and activates a TIMER (C) 64 of FIG. 3.

The AND circuits 54 and 56 of FIG. 3, along with AND circuit 60 and OR circuit 58 are arranged so as to comprise a Coincidence circuit 52. Coincidence circuit 52 develops an output signal 62 in response to both (1) the coincidence between signals $(I_A-I_O) Z_{R1}+I_OZ_{RO}-V_{AG}$ and $I_AX$, and (2) the presence of signal $V_{MT}$. The signal $V_{MT}$ is applied to and supervises AND circuit 60 in its development of the output signal 62. The output signal 62 is applied to TIMER (A) 72 and to a first input of AND circuit 68.

The TIMER (A) 72 develops an output signal 74 which is applied to a first input of OR circuit 80 having at a second input signal 78. Signal 78 is present if signal 70 produces an output of TIMER (B) 76. Signal 70 is produced when signals 62 and 66 are both present, signal 62 being the output of coincidence circuit 52, described above, and signal 66 is the output of TIMER (C) 64. OR circuit 80 develops an output signal 82 (TRIP) during the occurrence of signal 74 or signal 78. TIMER (A) 72 and TIMERS (B) 76 and (C) 64 each have a preselected delayed response time relative to their respectively applied signals so as to generate an output after the expiration of the respective preselected time.

The response time of the TIMER (B) 76 is selected relative to the frequency of the A.C. power system coupled to the transmission line 11. The response time of TIMER (A) 72 is selected relative to the frequency of the A.C. power system coupled to the transmission line 11 and increased by a quantity δ, given in electrical degrees, which, as will be described, is the maximum angular separation between the current $(I_R)$ in the relay and the fault current $(I_f)$ within a particular portion of a transmission line protected by the relay of the present invention. The response time of TIMER (C) 64 is selected to be of a value which is greater than the clearing or resetting time of the circuit breaker related to a particular portion of the transmission line.

TIMER (B) 76 is selected to have a value representative of 90 degrees relative to the frequency or period of the A.C. power source coupled to the transmission line 11. The selected value of 90 degrees for TIMER (B) 76 and also TIMER (A) 72 are related to electrical degrees and one electrical degree is associated with the period of the rated frequency of the power system connected to the transmission line. For example, for an A.C. power system having a frequency of 60 Hz, its time duration for the period of 360° is 1/60 sec which is equal to approximately 16.6 msec. The selected 90° phase relationship represents one-quarter of 16.6 msec., which is 4.16 msec., and is one of the desired selected time responses of TIMER (B) 76. Similar manipulation for an A.C. power system of 50 Hz reveals a response time of 5.0 msec. for TIMER (B) 76.

TIMER (A) 72 is selected to have the 90° relationship (4.16 msec. 60 Hz or 5.0 msec. 50 Hz) of TIMER (B) 66, but in addition the quantity δ is additive to the 90° so as to provide TIMER (A) 72 with a selected response of 90°+δ°. A typical value of δ is 20° or 0.92 msec (60 Hz) or 1.1 msec (50 Hz). TIMER (A) 72 therefore has a typical response time of 5.08 msec (60 Hz) or 6.1 msec (50 Hz).

TIMER (C) 64 is selected to have a typical value of 0.12 sec which is a typical clearing time for circuit breakers associated with transmission line 11.

In general, the overall control of TIMERS (A) 2, (B) 76, and (C) 64 is dependent upon the occurrence of signal $V_{MT}$. More particularly, the occurrence of signal $V_{MT}$ activates TIMER (C) 64 and initiates the possible operation of TIMERS (A) 72 and (B) 76. The possible operation of TIMER (A) is determined by the qualification of Coincidence circuit 52. The Coincidence circuit 52 is qualified or provides an output signal 62 upon the occurrence of signal $V_{MT}$ and upon the coincidence between the applied signals $I_AX$ and $(I_A-I_O)Z_{R1}+I_OZ_{RO}-V_{AG}$. The presence or occurrence of output signal 62 initiates the operation of TIMER (A) 72 and is also used to determine the operation of TIMER (B) 76. The operation of TIMER (B) 76 is further determined by TIMER (C) 64 via AND circuit 68. TIMER (B) initiates its operation upon the occurrence of two (2) conditions; (1) the presence of signal 62, and (2) the presence of signal 66 which is generated by TIMER (C) 64 after its preselected timer response initiated by the occurrence of signal $V_{MT}$.

The description to follow hereinafter makes reference to a Timer for RELAYS A, B, C, or D of FIGS. 1a and 1b, the Timer being termed a Zone 2 ($t_o$+0.3 sec) whose related circuitry is not shown in FIG. 3. As will be apparent hereinafter, the development of a Zone 2 ($t_o$+0.3 sec) timer involves quantities $Z_{R1}$ and $Z_{RO}$ having values greater than the hereinbefore described quantities of $Z_{R1}$ and $Z_{RO}$ related to the circuit arrangement of FIGS. 2 and 3. The increase of these quantities $Z_{R1}$ and $Z_{RO}$ of Zone 2 ($t_o$+0.3 sec) timer increases the reach of the protective relay. The term $t_o$ is to be described hereinafter.

The timer of the RELAY for Zone 2 ($t_o$+0.3 sec) is located in the output stage of the protective relay (not fully shown). The circuitry for this Zone 2 would be functionally similar to that illustrated in FIG. 3 except Timer A would be omitted and Timer C would be set to zero. The Zone 2 Timer ($t_o$+0.3 sec) would be added at the output of OR circuit 80.

The present invention relates to an improved reactance type relay and in order that it may be more fully appreciated reference is now made to a general discussion of a reactance relay.

A reactance relay is a special case of an angle impedance relay where the characteristic lies parallel to, and displaced from, the R axis; the relay will operate (theoretically) if the impedance seen by the relay has a reactive component equal or less than the reactance by which the characteristic is displaced from the R axis. The reactance relay (when connected phase to ground) is typically supervised by one or more relays of a type which will establish that the protected phase is faulted to ground and that the fault current is in the tripping direction. These supervising relays may be totally separate relays or they may be grouped with the reactance relay to form a more integrated protection. The primary purpose of the reactance relay is to establish that the reactive component of the impedance between the relay and the fault is within the "reach" of the relay.

The impedance that the relay "sees" for a fault in the line section is the self and mutual impedances of the line (established largely by the line design) and the impedance associated with the fault. The fault impedance is generally assumed to be a resistive impedance without any reactive component but whose magnitude may be quite variable and impossible to anticipate with any degree of precision. Thus the use of a reactance relay to measure the impedance to the fault location is very beneficial since the relay measures the reactive component of the impedance, which is capable of reasonably precise estimation (since it is largely a function of line design); but the relay ignores the resistive component of the impedance seen by the relay, which may not be possible to estimate with any useful degree of precision.

Theoretically, the reactance relay is an excellent concept for establishing whether or not a fault location is internal or external to the protected line section. Practically, the adequacy of the distance measurement that the reactance relay makes is a function of the relative magnitude and phase angle between the current in the fault and the current in the relay. If the phase angle of the relay current is the same as the fault current, then the fault resistance would appear resistive to the relay, but the fault resistance would appear larger if the fault current was larger than the relay current. The fault current will normally be different to the relay current except for the case of an internal fault where the relay terminal is the only source of fault current. The difference of the current in the relay and the fault results from infeed from other terminal(s) of the line. The phase angle difference is largely attributable to load current flowing over the line during the fault and/or variation in source impedance angles behind the relay terminal and the other terminals.

In general, my invention provides the ability to set the relay conservatively, that is, with significant margin against false tripping and still provide reasonable coverage of the line after the remote end of the transmission line 11 is tripped. An important feature of the invention is the use of two characteristics to optimize the performance of the relay. The initial characteristic, that is the characteristic established by the TIMER (A), may be described as a "tent" characteristic, which can be set with sufficient angular separation $\delta$ from a reactance characteristic to preclude overreach on an external fault with worst case phase angle relationship between current (I) of the relay and current (I) of the fault. The second or final characteristic, that is, the characteristic established by the TIMER (B), is activated after a short time delay, established by TIMER C, to permit the breaker at the substation at the far end of the line to interrupt an external fault. Because the second (or TIMER B) characteristic is not fundamentally an overreaching characteristic, but rather one that might overreach under less than likely worst case conditions, then the possibility of a combination of overreaching and breaker failure in an external fault becomes extremely remote. Thus the time delay established by TIMER C, from switching from the first characteristic, TIMER A, to the second characteristic, TIMER B, need not include delay for breaker failure timing as would a typical second zone timer of a typical second zone tripping function. Hence, the timing of the switching of the characteristics can reasonably be selected to coordinate with the first zone in the line ahead of the relay, and also with the second zone in the line behind the relay. The operational response characteristics of my improved reactance relay of FIG. 3 is best described with reference to FIGS. 1a and 1b.

Operation Response of the Circuit of FIG. 3

The operation of the circuit of FIG. 3 provides coordination of the responses between the reactive relays of the present invention located in substations A, B, C, and D shown in FIG. 1a. FIG. 1a shows stepped-like responses of RELAYS A, B, and C. Each of RELAYS A, B, and C are shown as having two-stepped responses. For example, the stepped-response of RELAY A is shown to comprise a first straight-like portion A ($t_o$) referring to Zone 1 of RELAY A and a second portion A ($t_o$+0.3 sec) referring to the Zone 2 of RELAY A which is also a straight-like response but of greater magnitude than portion A ($t_o$). The Zone 2 of RELAY A is associated with the timer ($t_o + 0.3$ sec) previously discussed.

The response A ($t_o$) is a response having no intentional additional delay in its development of an 82 (TRIP) signal of FIG. 3, that is, it reacts as soon as the preselected period of $90° + \delta$ of TIMER A expires.

The coordination provided by these two responses of RELAYS A, B, and C is best described with reference to FIG. 1b. FIG. 1b shows times labeled ($t_o$), ($t_o + 0.12$ sec) and ($t_o + 0.3$ sec) associated with the characteristics, to be described, of RELAYS A, B, and C. The label $t_o$ is meant to represent the time of the fault occurrence as detected by the development of the signal $V_{MT}$. The time 0.12 sec of label ($t_o + 0.12$ sec) is a typical selectable time marginally longer than the clearing time of the circuit breaker associated with the transmission line 11. The time 0.3 sec of label ($t_o + 0.3$ sec) is a typical time selected by the responsible personnel for the relay application for a Zone 2 time delay.

FIG. 1b shows a sloped impedance line $Z_L$ having an origin at the zero condition of an R-X plot. The origin is shown in FIG. 1b at a location A which is the Substation A of FIG. 1a. FIG. 1b further shows the impedance line $Z_L$ which has the line impedance angle of the transmission lines which interconnect Substation A with Substation B, Substation B with Substation C, and Substation C with Substation D. Substations B, C and D are shown in FIG. 1b by the use of terms B, C, and D respectively. Substations A, B, C, and D are shown as having associated circuit breakers C.B. ($A_2$); C.B. ($B_1$) and C.B. ($B_2$); C.B. ($C_1$) and C.B. ($C_2$); and C.B. ($D_1$), respectively.

FIG. 1b further shows the characteristics of the RELAYS A, B, and C, the first zone of each being determined by the circuit arrangement of FIG. 3. The second zone is a standard reactance characteristic and determined by the timer of the RELAYS A, B, C and D Zone 2 ($t_o + 0.3$ sec) timer. Each of response characteristics of RELAYS A, B, and C are substantially the same and therefore only the characteristic RELAY B is to be described.

The initial characteristic of RELAY B for Zone 1 has a tent-like shape. The second, or in most instances the final, characteristics of RELAY B for Zone 1 has a typical reactance shape. The characteristic of RELAY B for Zone 2 has a typical reactance shape.

The response of RELAY B having the initial characteristic of tent-like shape is comprised of two portions shown as two sloping lines B ($t_o$). The sloping lines B ($t_o$) are sloped with respect to a horizontal line B ($t_o + 0.12$ sec), shown in phantom, respresentative of the reactance response of RELAY B and which is the second portion of the response of RELAY B. The first portion B ($t_o$) is displaced from B ($t_o + 0.12$ sec) by the previously discussed angle of separation $\delta_B$.

FIG. 1b further shows three faults, FAULT A, FAULT B, and FAULT C which are responded to in a desired manner by the relay of the present invention located at Substation B.

The occurrence of FAULT A is responded to by the RELAY B in the following manner: FAULT A causes the circuit arrangement of FIG. 3 to develop the signals ($I_A - I_O$) $Z_{R1} + I_O Z_{RO} - V_{AG}$ and $I_A X$ having a coincidence greater than the preselected duration of $90° + \delta$ of TIMER (A), which, in turn, causes the generation of signal 82 (TRIP) of FIG. 3. TIMER (A) causes the generation of the 82 (TRIP) signal without an intentional time delay and causes normal clearing, that is, activating the circuit breaker C.B. ($B_2$) to provide the normal clearing time of 2 to 6 cycles (0.033 sec. to 0.1 sec, respectively, for 60 Hz applications).

The occurrence of FAULT B is responded to by the RELAY B in the following manner; because FAULT B is outside of the "tent" characteristic of RELAY B, the FAULT B does not cause TIMER (A) of the circuit arrangement of FIG. 3 to generate the signal 82 (TRIP). However, the occurrence of FAULT B does cause the activation of $V_{MT}$, which, in turn, causes the activation of TIMER C. TIMER C develops its output after a preselected delay (of 0.12 sec) following receipt of the $V_{MT}$ input signal; and this, in turn, transfers the response of RELAY B from its "tent" (TIMER A = $90° + \delta$) response (B = $t_o$) of FIG. 1b to its reactance (TIMER B = $90°$) response B ($t_o + 0.12$ sec) of FIG. 1b. From FIG. 1b it is seen that FAULT B is within the $90°$ response of TIMER B and correspondingly TIMER B causes the circuit arrangement of FIG. 3 to generate the 82 (TRIP) signal. The signal 82 (TRIP) causes the clearing of FAULT B in approximately 8 to 12 cycles (0.132 sec. to 0.198 sec. respectively for 60 Hz applications). The 8 to 12 cycles clearing is less than the Zone 2 at RELAY A, shown in FIG. 1a as being a value of $t_o + 0.3$ sec. The result of this interaction is that RELAY B at Substation B coordinates with the Zone 2 (A = $t_o + 0.3$ sec) of RELAY A at Substation A. More particularly, RELAY B causes FAULT B to be cleared and RELAY A resets before the Zone 2 timer of RELAY A times out, thus inhibiting the response of RELAY A to FAULT B.

FAULT C in FIG. 1b illustrates a fault in the transmission line between C and D, which by virtue of the effects of load flow and/or variation in source impedance angles, appears within the reach of the Zone 1 reactance relay at B.

The FAULT C is responded to by the RELAY C at Substation C and conversely, not responded to by the RELAY B at Substation B both in a desired manner. FAULT C is further shown in FIG. 1b as within the "tent" characteristic of RELAY C, and conversely, as outside of the "tent" characteristic of RELAY B.

The FAULT C causes the circuit arrangement of FIG. 3 associated with RELAY C to detect or "see" FAULT C, which, in turn, causes TIMER A ($90° + \delta$) of RELAY C to generate the 82 (TRIP) signal to breaker CB ($C_2$) without any intentional delay. RELAY C causes the FAULT C to be cleared within the previously mentioned 2 to 6 cycles.

FAULT C also causes the activation of TIMER C of RELAY B. However, Timer C will not time out to cause RELAY B to switch to its reactance characteristic since the $V_{MT}$ signal will reset when CB ($C_2$) clears the fault.

Again, the operation of the present invention provides the desired coordination between the RELAYS A, B, and C in their response to a FAULT C that may occur along the transmission line 11.

It should now be appreciated that my invention provides the ability and advantage to select the relay characteristics established by TIMERS (A), (B), and (C) so as to prevent false tripping while still providing the desired protection of the transmission line 11.

While I have shown and described particular embodiments of my invention, it will be obvious to those skilled in the art that various changes and modifications may be made without departing from my invention in its broader aspects; and I, therefore, intend herein to cover all such changes and modifications as fall within the true spirit and scope of my invention.

What is claimed is:

1. A reactance type relay having two characteristic TIMERS A and B and a TIMER C developing an output after a preselected delay following receipt of an input, said characteristic TIMER A providing said reactance type relay with an initial state tent-like characteristic, said characteristic TIMER B providing said reactance type relay with a final state reactance characteristic, said TIMER A having a setting of $90° + \delta$, which produces an angle of separation of $\delta$ electrical degrees between the tent-like and the reactance characteristics, and means responsive to the generation of an output by TIMER C for shifting the operating characteristic of the relay from the tent-like characteristic of TIMER A to the reactance characteristic of TIMER B.

2. A reactance type relay according to claim 1 which is adapted to be coupled to a three phase transmission line, said reactance type relay being responsive to an external signal $V_{MT}$ developed upon detection of a fault on the protected portion of one phase of the three phase transmission line, said TIMER C being responsive to said $V_{MT}$ signal and generating an output signal after expiration of said preselected delay following receipt of said $V_{MT}$ signal, said reactance type relay being further responsive to first and second phasor quantities $(I_P - I_O)Z_{R1} + I_O Z_{RO} - V_{PG}$ and $I_P X$, respectively, and in which the P subscript of the two phasor quantities signifies the one phase associated with the $V_{MT}$ signal, said reactance type relay further comprising:

coincidence means acting in response to coincidence between the $V_{MT}$ signal and the first and second phasor quantities for generating an output signal which is applied to and activates said TIMER A;

an AND circuit acting in response to coincidence between the coincidence means output signal and said output of said TIMER C for developing an output signal which is applied to and activates said TIMER B, and;

an OR circuit responsive to said output signals of TIMERS A and B for developing a TRIP signal in response to receipt of either of said output signals which TRIP signal is adapted to be coupled to the circuit breaker associated with said three phase transmission line.

3. A reactance type relay according to claim 1 which is adapted to be coupled to a three phase transmission line, said reactance type relay being responsive to an external signal $V_{MT}$ developed upon detection of a fault on the protected portion of one phase of the three phase transmission line, said TIMER C being responsive to said $V_{MT}$ signal and generating an output signal after expiration of said preselected delay following receipt of said $V_{MT}$ signal, said reactance type relay being further responsive to first and second phasor quantities $(I_P - I_O)Z_{R1} + I_O Z_{RO} - V_{PG}$ and $I_{P2} X$, respectively, and in which the P subscript of the two phasor quantities signifies the one phase associated with the $V_{MT}$ signal, said reactance type relay further comprising:

coincidence means acting in response to coincidence between the $V_{MT}$ signal and the first and second phasor quantities for generating an output signal which is applied to and activates said TIMER A;

an AND circuit acting in response to coincidence between the coincidence means output signal and said output of said TIMER C for developing an output signal which is applied to and activates said TIMER B, and;

an OR circuit responsive to said output signals of TIMERS A and B for developing a TRIP signal in response to receipt of either of said output signals which TRIP signal is adapted to be coupled to the circuit breaker associated with said three phase transmission line.

4. A reactance type relay according to claim 1, 2, or 3 in which said angle of separation $\delta$ is selected to correspond to the maximum angular separation between the current in the relay and the fault current for faults in or near the protected transmission line.

5. A reactance type relay according to claim 4 in which $\delta$ has a value of about 20 electrical degrees.

6. A reactance type relay according to claims 1, 2, or 3 in which said preselected delay of TIMER C is of a value slightly longer than the fault clearing time of the circuit breakers associated with the circuit breakers at or near the remote end of the protected transmission line.

* * * * *